US010321317B1

(12) United States Patent
Yau et al.

(10) Patent No.: US 10,321,317 B1
(45) Date of Patent: Jun. 11, 2019

(54) NFC-ENHANCED FIRMWARE SECURITY

(71) Applicant: American Megatrends, Inc., Norcross, GA (US)

(72) Inventors: Kai Yau, Duluth, GA (US); Santhosh K. Betha, Duluth, GA (US); Sai Kiran Talamudupula, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 14/730,973

(22) Filed: Jun. 4, 2015

(51) Int. Cl.
| | |
|---|---|
| *H04W 12/08* | (2009.01) |
| *G06F 21/62* | (2013.01) |
| *H04W 4/80* | (2018.01) |
| *G06F 21/35* | (2013.01) |
| *H04W 4/02* | (2018.01) |
| *G06F 8/65* | (2018.01) |

(52) U.S. Cl.
CPC .............. *H04W 12/08* (2013.01); *G06F 8/65* (2013.01); *G06F 21/35* (2013.01); *G06F 21/62* (2013.01); *H04W 4/02* (2013.01); *H04W 4/80* (2018.02)

(58) Field of Classification Search
CPC ............ G06F 21/62; G06F 8/65; G06F 21/35; H04W 12/00; H04W 12/08; H04W 4/80; H04W 4/02
USPC .................... 726/4, 7, 19; 709/220; 717/168
See application file for complete search history.

(56) References Cited

U.S. PATENT DOCUMENTS

| | | | | |
|---|---|---|---|---|
| 6,560,641 B1* | 5/2003 | Powderly | ............... | G06F 13/105 707/999.01 |
| 6,928,541 B2* | 8/2005 | Sekiguchi | ............. | G06F 9/4416 713/1 |
| 7,546,630 B2* | 6/2009 | Tabi | .................... | G06F 21/6227 726/2 |
| 8,646,034 B2* | 2/2014 | Murakami | ............ | G06F 9/4401 726/2 |
| 8,750,514 B2* | 6/2014 | Gallo | ..................... | G06Q 10/10 380/271 |
| 8,892,904 B2* | 11/2014 | Mirashrafi | .............. | G06F 21/31 713/191 |
| 9,503,592 B2* | 11/2016 | Fein | ...................... | G06F 3/1204 |
| 9,571,164 B1* | 2/2017 | Luo | ....................... | H04B 5/0056 |
| 10,063,381 B2* | 8/2018 | Lee | ......................... | G06Q 20/40 |
| 2014/0344446 A1* | 11/2014 | Rjeili | ...................... | H04L 43/04 709/224 |

(Continued)

*Primary Examiner* — Saleh Najjar
*Assistant Examiner* — Feliciano S Mejia
(74) *Attorney, Agent, or Firm* — Newport IP, LLC

(57) ABSTRACT

Technologies are disclosed herein for near field communication ("NFC") enhanced firmware security. Using an implementation of the technologies disclosed herein, an NFC card or an NFC-equipped mobile device can be utilized to access an NFC-equipped server computer. The server computer reads a login key from an NFC card or an NFC-equipped mobile device. Based upon the login key, a firmware executing on the server computer can determine whether a user is to have administrator access rights, non-administrator user access rights, or no access rights at all to a firmware setup menu provided by the server computer. Based upon the login key, the firmware executing in the NFC-equipped server computer can also identify an operating system to be booted by the server computer. In some configurations, an NFC-equipped mobile device contacts an authorization server to obtain the login key based upon a user's access credentials.

20 Claims, 5 Drawing Sheets

(56) References Cited

U.S. PATENT DOCUMENTS

2015/0089221 A1\* 3/2015 Taylor .................. H04W 12/08
 713/168
2015/0137942 A1\* 5/2015 Suwald .................. G06F 21/34
 340/5.65

\* cited by examiner

NFC-ENHANCED FIRMWARE SECURITY

BACKGROUND

Many types of organizations utilize server computers to store highly sensitive information and/or to provide critical functionality. Because these server computers can contain confidential and/or other types of sensitive information, it is important that access to the server computers is restricted only to those individuals having proper access rights. Additionally, it is also important that even authorized users are allowed access to server computers only to the extent that they are permitted. For instance, administrators might be provided full access to certain functionality provided by a server computer, while non-administrator users are provided a more restricted level of access. Implementing this type of security can, however, be difficult, particularly with regard to firmware-provided functionality.

It is with respect to these and other considerations that the disclosure made herein is presented.

SUMMARY

The technologies disclosed herein provide functionality for near field communication ("NFC") enhanced firmware security. Through an implementation of the disclosed technologies, secure access can be had to server computers utilizing NFC-equipped cards or devices. For example, and without limitation, using an implementation of the technologies disclosed herein, an NFC card or an NFC-equipped mobile device can be utilized to access functionality provided by a firmware executing in an NFC-equipped server computer.

In one implementation, an NFC-equipped server computer reads a login key from an NFC card or an NFC-equipped device, such as a mobile device like a smartphone or tablet computing device. Based upon the login key, a firmware executing on the NFC-equipped server computer can determine whether a user is to have administrator access rights, non-administrator user access rights, or no access rights at all to a firmware setup menu provided by the server computer. Based upon the login key, the firmware executing on the NFC-equipped server computer can also identify an operating system to be booted by the server computer. In some configurations, an NFC-equipped mobile device contacts an authorization server to obtain the login key based upon a user's access credentials.

The above-described subject matter can be implemented as a computer-controlled apparatus, a computer-implemented process, a computing system, or as an article of manufacture such as a non-transitory computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
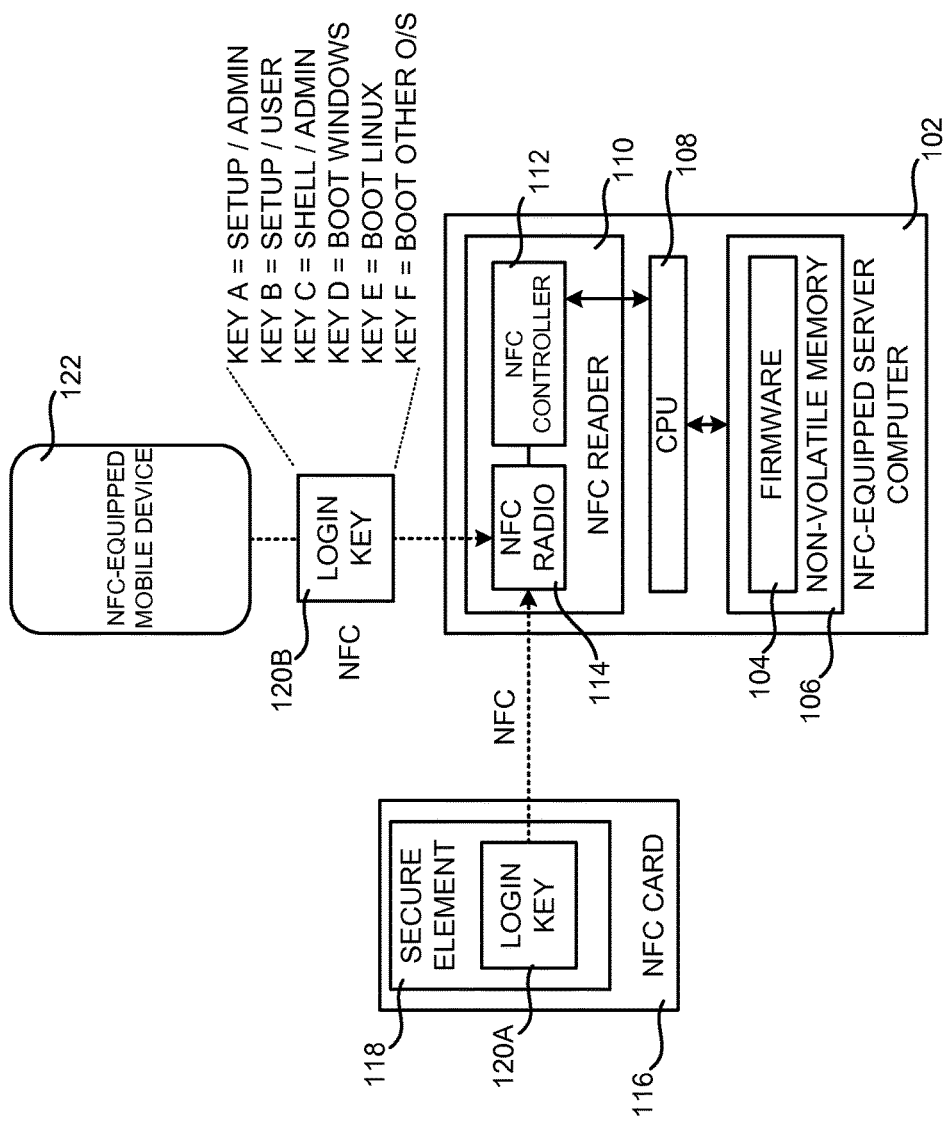
FIG. 1 is a block diagram showing aspects of a system disclosed herein for NFC-enhanced firmware security.

The following detailed description is directed to technologies for NFC-enhanced firmware security. While the subject matter described herein is presented in the general context of program modules that execute in conjunction with the execution of an operating system and application programs on one or more computer systems, those skilled in the art will recognize that other implementations can be performed in combination with other types of program modules.

Generally, program modules include routines, programs, components, data structures, and other types of structures that perform particular tasks or implement particular abstract data types. Moreover, those skilled in the art will appreciate that the subject matter described herein can be practiced with other computer system configurations, including handheld devices, multiprocessor systems, microprocessor-based or programmable consumer electronics, minicomputers, mainframe computers, and the like.

The subject matter described herein can be practiced in a distributed computing environment where tasks are performed by remote processing devices that are linked through a communications network, and wherein program modules can be located in both local and remote memory storage devices. It should be appreciated, however, that the implementations described herein can also be utilized in conjunction with stand-alone computer systems and other types of computing devices. It should also be appreciated that the embodiments presented herein can be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several FIGURES, aspects of a computing system and methodology for NFC-enhanced firmware security will be described.

FIG. 1 is a block diagram showing aspects of a system disclosed herein for NFC-enhanced firmware security. As known to those skilled in the art, NFC is a set of technologies that permit devices to communicate over a short distance (e.g. 10 cm or less) by bringing them into close proximity with one another. NFC devices typically operate in one or more of three modes: NFC initiator; NFC target; or NFC peer-to-peer mode. An NFC initiator actively generates a radio frequency ("RF") field that can power a passive NFC target (an unpowered chip), commonly referred to as a "tag." NFC peer-to-peer communication differs in application as both devices (i.e. peers) are powered. NFC tags typically contain data (e.g. between 96 and 4,096 bytes of memory). Additional details regarding the specific implementation of NFC technologies can be obtained from the NFC Forum.

As shown in FIG. 1, an NFC-equipped server computer 102 (which might be referred to as the "server 102") is utilized in one configuration. The server 102 is a standard server computer that has been equipped with an NFC reader 110 and appropriate software (e.g. drivers, etc.) for utilizing the NFC reader 110. As shown in FIG. 1, the NFC reader 110 is configured with an NFC controller 112 and an NFC radio 114. The NFC reader 110 might also utilize other components not explicitly shown in FIG. 1. The NFC reader 110 allows the NFC-equipped server computer 102 to read NFC tags from other devices, such as the NFC card 116 and/or the NFC-equipped mobile device 122 when those devices are placed in proximity to the NFC reader 110.

As is also shown in FIG. 1, the NFC-equipped server computer 102 is also equipped with a central processing unit ("CPU") 108 and a non-volatile memory 106 storing a firmware 104. As known to those skilled in the art, the firmware 104 provides functionality for initializing memory, recognizing and controlling various computing devices within the server 102 or connected to the server 102, and/or performing other functions when the server 102 is powered on. Such a firmware 104 is typically stored on a non-volatile memory 106 within the server 102. The firmware 104 might be a basic input/output system ("BIOS") firmware, an Extensible Firmware Interface ("EFI") compatible firmware, or another type of computer system firmware altogether.

The firmware 104 also provides a setup menu (not shown in FIG. 1). The firmware-provided setup menu provides an interface through which a user of the NFC-equipped server computer 102 can specify parameters to customize the operation of the NFC-equipped server computer 102. For example, and without limitation, the firmware-provided setup menu might provide functionality for defining parameters relating to CPUs, memory, mass storage devices, security, system time and/or date, language, power, booting and, potentially, other types of parameters not specifically mentioned herein.

The firmware 104 might also provide the ability to password protect the NFC-equipped server computer 102. For example, and without limitation, a user may be required to provide a password to the NFC-equipped server computer 102 to access the setup menu described above or to boot the NFC-equipped server computer 102. An administrator password can be defined in some implementations that permits a user to access the full range of parameters available through the setup menu. A non-administrator "user" password might also be defined that provides access to a more limited set of parameters available through the setup menu.

The firmware 104 is also configured to utilize the NFC reader 110 in order to provide secure access to the NFC-equipped server computer 102. For example, and without limitation, the firmware 104 can utilize the NFC reader 110 to read an NFC tag containing a login key 120A from a secure element 118 of an NFC card 116 when the NFC card 116 is placed in proximity to the NFC reader 110. In a similar fashion, the firmware 104 can utilize the NFC reader 110 to read a login key 120B from an NFC-equipped mobile device 122, such as a smartphone or a tablet computing device. The firmware 104 can also read from other NFC-equipped components in a similar fashion.

The login keys 120 contain data that indicate whether administrator access rights or non-administrator access rights are to be permitted to the firmware setup menu described above. For example, and without limitation, a user may present an NFC card 116 that includes a login key 120A having data indicating that administrator access is to be provided. When the firmware 104 reads such a login key 120A from the NFC card 116, the firmware 104 will provide administrator (i.e. full) access to the firmware setup menu. A user might also present an NFC-equipped mobile device 122 that includes a login key 120B having data indicating that non-administrator user access is to be provided. When the firmware 104 reads such a login key 120B from the NFC-equipped mobile device 122, the firmware 104 will provide non-administrator user (i.e. restricted) access to the firmware setup menu. It should be appreciated that these examples are merely illustrative and that other types of access rights other than administrator and user can be defined and provided by the firmware 104. In some configurations, for example, a login key 120 might specify that access to the setup menu is to be restricted (e.g. a user is not permitted to access the setup menu).

In some configurations, a login key 120 also specifies an operating system that is to be booted by the NFC-equipped server computer 102 when the firmware setup menu is exited. For example, and without limitation, a login key 120 might specify that the NFC-equipped server computer 102 is to boot the MICROSOFT WINDOWS operating system, the LINUX operating system, or another operating system. A login key 120 might also include data indicating that the NFC-equipped server computer 102 is to be booted to a shell and that a user is to have administrator rights to the shell. Additional details regarding these processes will be provided below with regard to FIG. 2.

Figure 2:
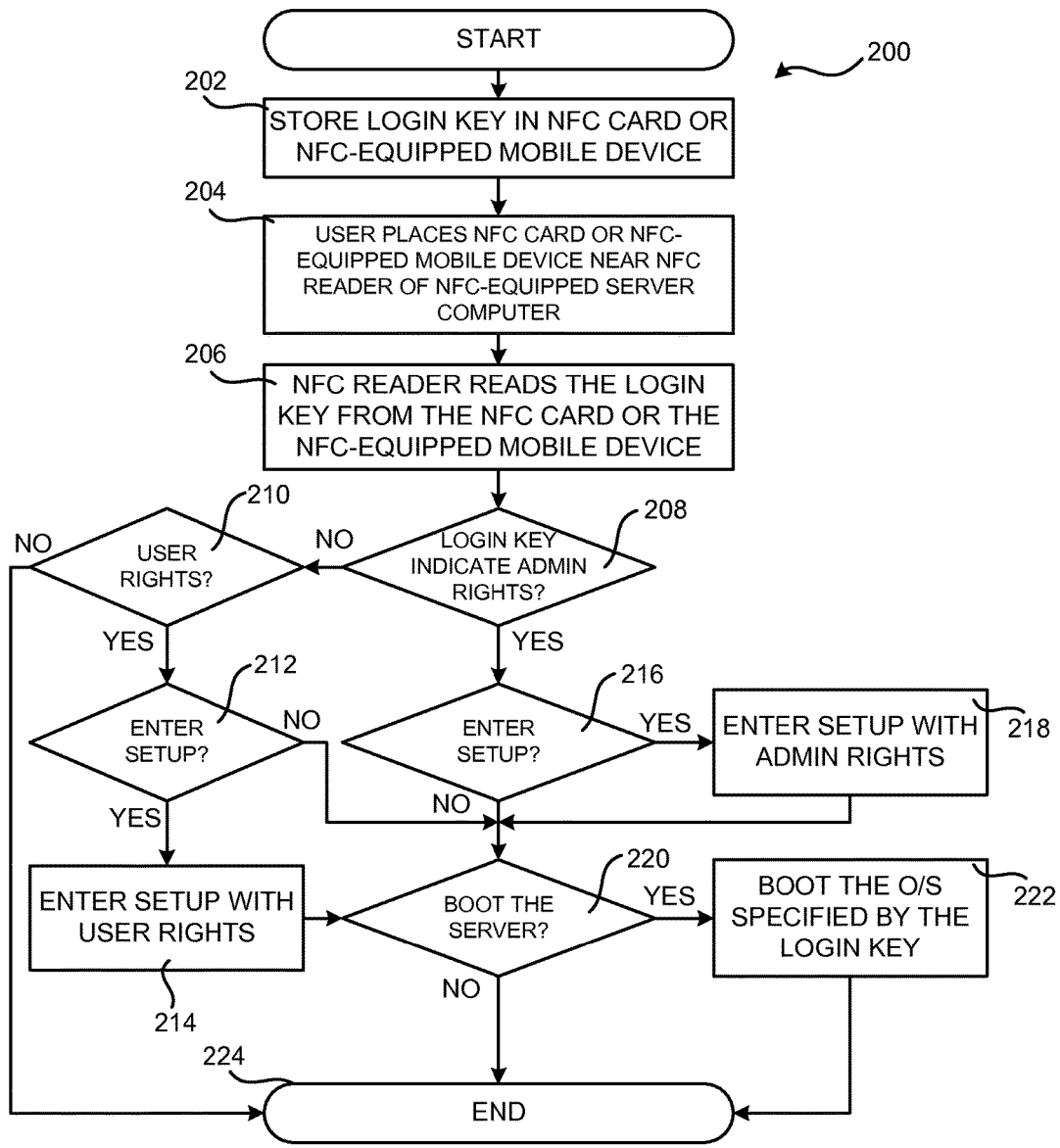
FIG. 2 is a flow diagram illustrating aspects of one method disclosed herein for NFC-enhanced firmware security utilizing the mechanism illustrated in FIG. 1.

FIG. 2 is a flow diagram illustrating aspects of one routine 200 disclosed herein for NFC-enhanced firmware security utilizing the mechanism illustrated in FIG. 1. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules can be implemented in software, in firmware, in special purpose digital logic, and any combination.

The routine 200 begins at operation 202, where a login key 120 is stored in an NFC card 116 or an NFC-equipped mobile device 122. As discussed above, in one configuration the login key 120 contains data indicating whether a user is to be provided administrator access to a firmware 104, user access to the firmware 104, or no access at all to the firmware 104. The login key 120 might also include data indicating whether a server computer 102 is to boot a particular operating system. The login key 120 might also include data not specifically identified herein.

From operation 202, the routine 200 proceeds to operation 204, where a user places the NFC card 116 or the NFC-equipped mobile device 122 on or near the NFC reader 110. In response thereto, the routine 200 proceeds to operation 206, where the NFC reader 110 reads the login key 120 from the NFC card 116 or the NFC-equipped mobile device 122.

From operation 206, the routine 200 proceeds to operation 208, where the firmware 104 determines whether the login key 120 indicates that administrator access rights are to be provided. If so, the routine 200 proceeds to operation 216, where the firmware 104 determines whether the firmware setup menu is to be entered. If so, the routine 200 proceeds from operation 216 to operation 218, where the user is provided access to the firmware setup menu with administrator rights. The routine 200 then proceeds from operation 218 to operation 220, described below.

If, at operations 208 and 210, the firmware 104 determines that the login key 120 indicates that user access rights are to be provided, the routine 200 proceeds from operation 210 to operation 212. At operation 212, the firmware 104 determines whether the firmware setup menu is to be entered. If so, the routine 200 proceeds from operation 212 to operation 214, where the user is provided access to the firmware setup menu with non-administrator user access rights. The routine 200 then proceeds from operation 214 to operation 220, described below.

At operation 220, the firmware 104 determines if the server computer 102 is to be booted. If so, the routine 200 proceeds from operation 220 to operation 222, where the operating system specified by the login key 120 received at operation 206 is booted. The routine 200 then proceeds from operation 222 to operation 224, where it ends.

Figure 3:
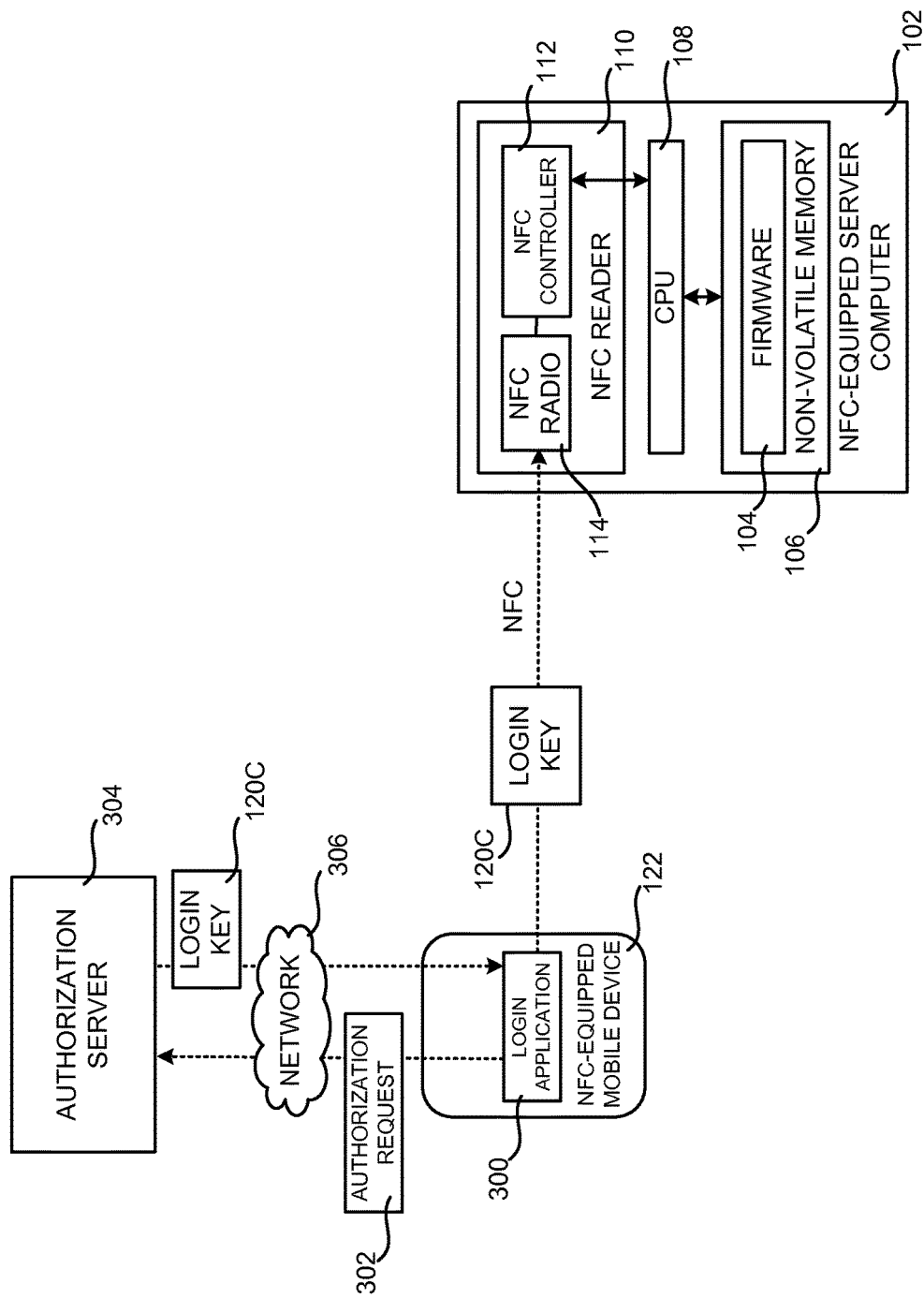
FIG. 3 is a block diagram showing aspects of another system disclosed herein for NFC-enhanced firmware security.

FIG. 3 is a block diagram showing aspects of another system disclosed herein for NFC-enhanced firmware security. In the configuration shown in FIG. 3, the NFC-equipped mobile device 122 is configured with a login application 300. The login application 300 is a software application that is configured to receive, from a user, a request to access the NFC-equipped server computer 102. In response to receiving such a request, the login application 300 may receive user credentials from the user, such as a username and password.

The login application 300 is also configured to transmit an authorization request 302 to an authorization server 304 via a network 306, such as the Internet. The authorization request 302 is a request for a login key 120C to access the NFC-equipped server computer 120. The authorization request 302 might also include the user credentials, such as the user's username and password. The authorization request 302 might also include other information, such as data identifying the particular NFC-equipped server computer 102 for which access has been requested.

The authorization server 304 then determines, based upon the authorization request 302, whether a user is authorized to access the firmware 104 of the NFC-equipped server computer 102 and, if so, the extent to which access is to be provided. For instance, the authorization server 304 might determine whether administrator rights or non-administrator rights are to be provided. The authorization server 304 might also determine whether the NFC-equipped server computer 102 is to be booted to an operating system. The NFC-equipped server computer 102 is then configured to create a login key 120C that includes data specifying the appropriate authorizations for the user.

Once the authorization server 304 has generated the login key 120C, the authorization server 304 provides the login key 120C to the login application 300 executing on the NFC-equipped mobile device 122 in response to the authorization request 302. In turn, the login key 120C is provided to the NFC-equipped server computer 102 when the NFC-equipped mobile device 122 is placed in proximity to the NFC reader 110.

As in the example described above with regard to FIGS. 1 and 2, the firmware 104 then utilizes the login key 120C to determine the access rights to the firmware setup menu that are to be provided. The firmware 104 might also utilize the data stored in the login key 120C to determine the operating system to be booted by the NFC-equipped server computer 102 once the user has exited the firmware setup menu. Additional details regarding this process will be provided below with regard to FIG. 4.

Figure 4:
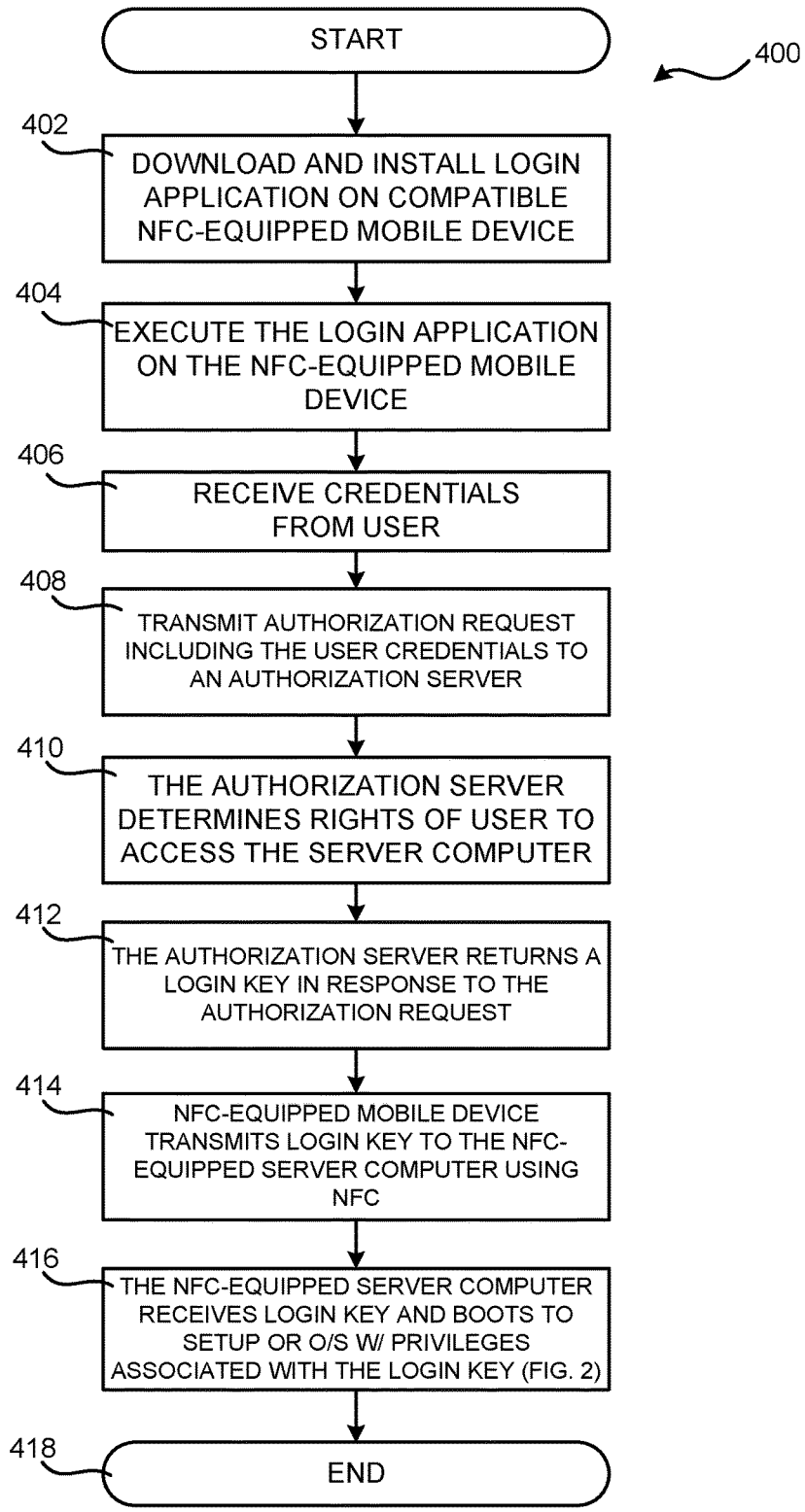
FIG. 4 is a flow diagram illustrating aspects of one method disclosed herein for NFC-enhanced firmware security utilizing the mechanism illustrated in FIG. 3.

FIG. 4 is a flow diagram illustrating aspects of one routine 400 disclosed herein for NFC-enhanced firmware security utilizing the mechanism illustrated in FIG. 3. The routine 400 begins at operation 402, where the login application 300 is downloaded and installed on a compatible NFC-enabled mobile device 122. The routine 400 then proceeds to operation 404, where the login application 300 is executed on the NFC-equipped mobile device 122. User credentials, such as a login and password, are then received from a user at operation 406.

From operation 406, the routine 400 proceeds to operation 408, where the login application 300 transmits an authorization request 302 to the authorization server 304. As discussed above, the authorization request 302 can include the user credentials and/or other information identifying a user that seeks to access the NFC-equipped server computer 102. The routine 400 then proceeds to operation 410.

At operation 410, the authorization server 304 utilizes the data contained in the authorization request 302 to determine the access rights that are to be provided to the user operating the NFC-equipped mobile device 122. As discussed above, the access rights may be determined based upon the credentials provided in the authorization request 302. A security policy and/or other types of data might also be consulted to determine the access rights for the user. The authorization server 304 then returns a login key 120C in response to the authorization request 302 at operation 412.

From operation 412, the routine 400 proceeds to operation 414, where the NFC-equipped mobile device 122 transmits the login key 120C to the NFC-equipped server computer 102 when the NFC-equipped mobile device 122 is placed in proximity to the NFC-equipped server computer 102. The firmware 104 executing on the NFC-equipped server computer 102 receives the login key 120C at operation 416 and provides access to the firmware setup menu based on the contents of the login key 120C. For example, administrator access rights, user access rights, or no access rights at all might be provided by the firmware 104. Additionally, the firmware 104 might cause the NFC-equipped server computer 102 to boot to an operating system specified in the login key 120C. Additional details regarding these processes were provided above with regard to FIG. 2. It should be appreciated that examples given above are merely illustrative and that the firmware 104 might customize the operation of the NFC-equipped server computer 102 in other ways based upon the content of the login key 120C.

Figure 5:
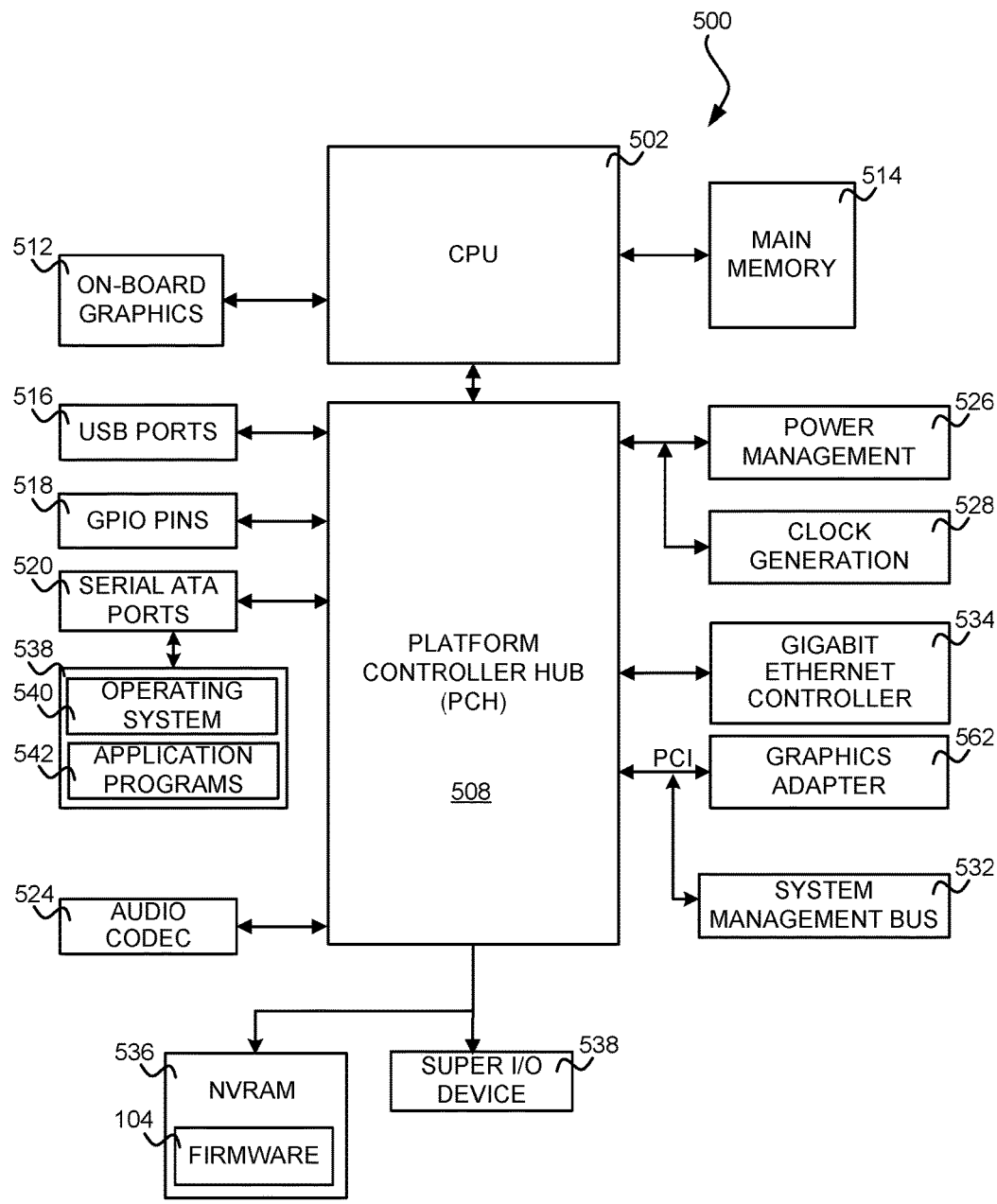
FIG. 5 is a computer architecture diagram showing a computer architecture suitable for implementing the various computer systems described herein.

Referring now to FIG. 5, an illustrative computer architecture for practicing the technologies disclosed herein for NFC-enhanced firmware security will be described. It should be appreciated that although the embodiments described herein are discussed in the context of a conventional desktop or server computer 102, the embodiments can be utilized with virtually any type of computing device that executes a firmware 104.

In particular, FIG. 5 shows aspects of an illustrative computer system 500 that can be utilized to implement some or all of the computing devices described herein. For example, and without limitation, the computer system 500 shown in FIG. 5 can be utilized to implement the NFC-equipped server computer 102. A computer architecture similar to that shown in FIG. 5 can also be utilized to implement the NFC-equipped mobile device 122 and the authentication server 304.

The computer system 500 shown in FIG. 5 can include a baseboard, or "motherboard," which is a printed circuit board to which a multitude of components or devices can be connected by way of a system bus or other electrical communication path. In one illustrative embodiment, a central processing unit ("CPU") 502 operates in conjunction with a Platform Controller Hub ("PCH") 508. The CPU 502 can be a standard central processor that performs arithmetic and logical operations necessary for the operation of the computing system 500. The computing system 500 can include a multitude of CPUs 502. Each CPU 502 might include multiple processing cores.

The CPU 502 provides an interface to a random access memory ("RAM") used as the main memory 514 in the computing system 500 and, possibly, to an on-board graphics adapter 512. The PCH 508 can provide an interface between the CPU 502 and the remainder of the computing system 500. The PCH 508 can also be responsible for controlling many of the input/output functions of the computing system 500. In particular, the PCH 508 can provide one or more universal serial bus ("USB") ports 516, an audio codec 524, a gigabit Ethernet controller 534, and one or more general purpose input/output ("GPIO") pins 518. The USB ports 516 can include USB 2.0 ports, USB 3.0 ports and USB 3.1 ports among other types of USB ports. The audio codec 524 can include Intel High Definition Audio, Audio Codec '97 ("AC'97") and Dolby TrueHD among others. Power management circuitry 526 and clock generation circuitry 528 can also be utilized through the PCH 508. An NFC reader 110, such as that described above, can be connected to the USB ports 516 or the associated USB bus.

The PCH 508 can also include functionality for providing networking functionality through a gigabit Ethernet controller 534. The gigabit Ethernet controller 534 is capable of connecting the computing system 500 to another computing system via a network. Connections which can be made by the gigabit Ethernet controller 534 can include LAN or WAN connections. LAN and WAN networking environments are commonplace in offices, enterprise-wide computer networks, intranets, and the Internet.

The PCH 508 can also provide a bus for interfacing peripheral card devices such as a graphics adapter 562. The bus can be implemented as a Peripheral Component Interconnect ("PCI") bus, a Peripheral Component Interconnect eXtended ("PCI-X") bus or a Peripheral Component Interconnect Express ("PCIe") bus among others. The PCH 508 can also provide a system management bus 532 for use in managing the various components of the computing system 500.

The PCH 508 is also configured to provide one or more interfaces for connecting mass storage devices to the computing system 500. For instance, according to an embodiment, the PCH 508 includes a serial advanced technology attachment ("SATA") adapter for providing one or more serial ATA ports 520. The serial ATA ports 520 can be connected to one or more mass storage devices storing an operating system 540 and application programs 542, such as the SATA disk drive 538. As known to those skilled in the art, an operating system 540 comprises a set of programs that control operations of a computer and allocation of resources. Application programs 542 are programs that execute on top of the operating system 540 software, or other runtime environment, and uses computer resources to perform application specific tasks desired by the user.

According to one embodiment of the invention, the operating system 540 comprises the LINUX operating system. According to another embodiment of the invention the operating system 540 comprises a version of the WINDOWS operating system from MICROSOFT CORPORATION. According to other embodiments, the operating system 540 can comprise the UNIX, SOLARIS, or APPLE OSX operating system. It should be appreciated that other operating systems can also be utilized.

The mass storage devices connected to the PCH 508, and their associated computer-readable storage media, provide non-volatile storage for the computing system 500. Although the description of computer-readable storage media contained herein refers to a mass storage device, such as a hard disk or CD-ROM drive, it should be appreciated by those skilled in the art that computer-readable storage media can be any available media that can be accessed by the computing system 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical disk storage, magnetic cassettes, magnetic tape, magnetic disk storage or other magnetic storage devices, or any other non-transitory medium which can be used to store the desired information and which can be accessed by the computing system 500.

A low pin count ("LPC") interface can also be provided by the PCH 508 for connecting a Super I/O device 538. The Super I/O device 538 is responsible for providing a number of input/output ports, including a keyboard port, a mouse port, a serial interface, a parallel port, and other types of input/output ports. The LPC interface can also connect a computer storage media such as a ROM or a flash memory such as a non-volatile random access memory ("NVRAM") 536 for storing a firmware 104 that includes program code containing the basic routines that help to start up the computing system 500 and to transfer information between elements within the computing system 500. Some examples of firmware 104 include a BIOS firmware, an EFI-compatible firmware, or an Open Firmware, among others.

It should be appreciated that the program modules disclosed herein, including the firmware 104, can include software instructions that, when loaded into the CPU 502 and executed, transform a general-purpose computing system into a special-purpose computing system customized to facilitate all, or part of, the operations disclosed herein. As detailed throughout this description, the program modules can provide various tools or techniques by which the computing system 500 can participate within the overall systems or operating environments using the components, logic flows, and/or data structures discussed herein.

The CPU 502 can be constructed from any number of transistors or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein. The states of either machine can also be transformed by receiving input from one or more user input devices, network interfaces (such as the gigabit Ethernet controller 534), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media; whether the storage media are characterized as primary or secondary storage; and the like. For example, if the storage media are implemented as semiconductor-based memory, the program modules can transform the physical state of the semiconductor memory when the software or firmware 104 is encoded therein. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the computing system 500 can comprise other types of computing devices, including hand-held computers, embedded computer systems, mobile devices like smartphones and tablet computing devices, and other types of computing devices known to those skilled in the art. It is also contemplated that the computing system 500 might not include all of the components shown in FIG. 5, can include other components that are not explicitly shown in FIG. 5, or can utilize an architecture completely different than that shown in FIG. 5. For example, the computer system 500 might include one or more radios for communicating over a wireless cellular communications network, one or more radios for other types of near field communication (e.g. BLUETOOTH), and/or other components not shown in FIG. 5.

Based on the foregoing, it should be appreciated that technologies for NFC-enhanced firmware security have been provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer-implemented method for accessing a near field communication (NFC) equipped server computer, the method comprising:
   reading a login key at the NFC-equipped server computer from an NFC-equipped mobile device via NFC, wherein the login key indicates access rights and is generated at an authorization server in response to a user login request at the NFC-equipped mobile device;
   determining whether the login key read from the NFC-equipped mobile device indicates that a user is to be provided first rights or second rights to a setup menu provided by a firmware executing in the NFC-equipped server computer;
   providing access to the firmware-provided setup menu with first rights if the login key indicates that the user is to be provided the first rights; and
   providing access to the firmware-provided setup menu with second rights if the login key indicates that the user is to be provided the second rights.

2. The method of claim 1, wherein the first rights comprise administrator rights and wherein the second rights comprise non-administrator user rights.

3. The method of claim 1, wherein the authorization server is other-than the NFC-equipped server computer.

4. The method of claim 1, wherein the login key further specifies an operating system that is to be booted by the NFC-equipped server computer.

5. The method of claim 4, further comprising:
   identifying, based on the login key, the operating system that is to be booted by the NFC-equipped server computer; and
   causing the NFC-equipped server computer to boot the operating system.

6. The method of claim 1, wherein the login key further indicates that the user is not permitted to access the firmware-provided setup menu.

7. The method of claim 6, further comprising:
   determining that the login key indicates that the user is not permitted to access the firmware-provided setup menu; and
   restricting access to the firmware-provided setup menu.

8. An apparatus, comprising:
   at least one processor; and
   a computer-readable storage medium having instructions stored thereupon that are executable by the processor and which, when executed by the processor, cause the apparatus to
   receive a first request to access a near field communication (NFC)-equipped server computer,
   in response to receiving the first request, transmit an authorization request from the apparatus to an authorization server, the authorization request comprising a second request to access the NFC-equipped server computer,
   receive from the authorization server in response to the second request a login key for use in accessing the NFC-equipped server computer, wherein the login key indicates access rights and originates from the authorization server, and
   provide the login key to the NFC-equipped server computer via NFC, whereby the NFC-equipped server computer is configured to determine, using the login key, the access rights to the NFC-equipped server computer.

9. The apparatus of claim 8, wherein the authorization request specifies user credentials for a user of the apparatus making the request to access the NFC-equipped server computer.

10. The apparatus of claim 9, wherein the login key specifies that the user is to have first access rights to a firmware-provided setup menu provided by a firmware of the NFC-equipped server computer.

11. The apparatus of claim 10, wherein the first access rights comprise administrator access rights or non-administrator user access rights.

12. The apparatus of claim 8, wherein the authorization server is distinct from the NFC-equipped server computer.

13. The apparatus of claim 9, wherein the login key further specifies an operating system that is to be booted by the NFC-equipped server computer.

14. A non-transitory computer-readable storage medium having instructions stored thereupon which, when executed by a processor, cause the processor to:
receive a first request to access a near field communication (NFC)-equipped server computer;
in response to receiving the first request, transmit an authorization request to an authorization server, the authorization request comprising a second request to access the NFC-equipped server computer, wherein the authorization server is separate from the NFC-equipped server computer;
receive from the authorization server in response to the second request a login key for use in accessing the NFC-equipped server computer, wherein the login key indicates access rights and originates from the authorization server; and
provide the login key from the apparatus to the NFC-equipped server computer via NFC.

15. The non-transitory computer-readable storage medium of claim 14, wherein the NFC-equipped server computer is configured to determine, using the login key, access rights to the NFC-equipped server computer.

16. The non-transitory computer-readable storage medium of claim 14, wherein the authorization request specifies user credentials for a user of the apparatus making the request to access the NFC-equipped server computer.

17. The non-transitory computer-readable storage medium of claim 14, wherein the login key specifies that a user is to have first access rights to a setup menu provided by a firmware of the NFC-equipped server computer.

18. The non-transitory computer-readable storage medium of claim 17, wherein the first access rights comprise administrator access rights.

19. The non-transitory computer-readable storage medium of claim 17, wherein the first access rights comprise non-administrator user access rights.

20. The non-transitory computer-readable storage medium of claim 14, wherein the login key further specifies an operating system that is that to be booted by NFC-equipped server computer.

* * * * *